(12) United States Patent
Gehrke

(10) Patent No.: US 10,826,367 B2
(45) Date of Patent: Nov. 3, 2020

(54) ELECTRIC MACHINE WITH VARIABLE MOTOR CONSTANTS

(71) Applicant: Schaeffler Technologies AG & Co. KG, Herzogenaurach (DE)

(72) Inventor: Lars Gehrke, Bühl (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 214 days.

(21) Appl. No.: 15/736,658

(22) PCT Filed: Jun. 22, 2016

(86) PCT No.: PCT/DE2016/200285
§ 371 (c)(1),
(2) Date: Dec. 14, 2017

(87) PCT Pub. No.: WO2016/206682
PCT Pub. Date: Dec. 29, 2016

(65) Prior Publication Data
US 2018/0175712 A1 Jun. 21, 2018

(30) Foreign Application Priority Data

Jun. 23, 2015 (DE) .................. 10 2015 211 531

(51) Int. Cl.
*H02K 21/00* (2006.01)
*H02K 21/02* (2006.01)
(Continued)

(52) U.S. Cl.
CPC ........... *H02K 21/028* (2013.01); *H01F 7/122* (2013.01); *H02K 1/2766* (2013.01); *H02K 7/06* (2013.01);
(Continued)

(58) Field of Classification Search
CPC .... H02K 7/06; H02K 41/0356; H02K 49/104; H02K 21/208; H02K 7/122; H02K 7/086; H02K 41/031; H02K 21/14
(Continued)

(56) References Cited

U.S. PATENT DOCUMENTS 2,882,428 A * 4/1959 Frisch ...................... H02K 7/06
310/83
6,158,295 A * 12/2000 Nielsen .................. F16H 25/20
192/223.4
(Continued)

FOREIGN PATENT DOCUMENTS

CN 1874117 A 12/2006
DE 102010049618 A1 5/2011
(Continued)

OTHER PUBLICATIONS

International Search Report for PCT/DE2016/200285; 2 pgs; dated Sep. 19, 2016 by European Patent Office.
(Continued)

*Primary Examiner* — Thanh Lam
(74) *Attorney, Agent, or Firm* — Kevin L. Parks

(57) ABSTRACT

An electrical machine includes a stator and a rotor rotatably mounted in the stator. A spindle is guided through the electrical machine. At least one magnetic flux-conductive assembly which can be introduced into the electrical machine is provided. The magnetic flux-conductive assembly is disposed on the spindle in a linearly displaceable manner in order to vary a motor constant of the electrical machine as a result of a displacement into the electrical machine.

8 Claims, 4 Drawing Sheets

(51) Int. Cl.
*H01F 7/122* (2006.01)
*H02K 1/27* (2006.01)
*H02K 7/06* (2006.01)
*H02K 7/08* (2006.01)
*H02K 41/03* (2006.01)
*H02K 21/14* (2006.01)

(52) U.S. Cl.
CPC .......... *H02K 7/086* (2013.01); *H02K 41/031* (2013.01); *H02K 21/14* (2013.01)

(58) Field of Classification Search
USPC ........................................ 310/15, 12.24, 103
See application file for complete search history.

(56) References Cited

U.S. PATENT DOCUMENTS

| | | | | |
|---|---|---|---|---|
| 6,377,010 | B1* | 4/2002 | Roither | A47B 9/10 |
| | | | | 310/80 |
| 8,314,518 | B2* | 11/2012 | Hors | F16H 25/20 |
| | | | | 310/12.14 |
| 2008/0246347 | A1* | 10/2008 | Okada | H02K 41/031 |
| | | | | 310/12.13 |
| 2009/0001914 | A1 | 1/2009 | Atarashi et al. | |
| 2011/0006617 | A1* | 1/2011 | Budde | H02K 16/00 |
| | | | | 310/12.14 |
| 2011/0084559 | A1* | 4/2011 | Finkbeiner | G01D 5/485 |
| | | | | 310/12.19 |
| 2011/0280599 | A1 | 11/2011 | Ino et al. | |
| 2013/0147285 | A1* | 6/2013 | Mader | H02K 16/00 |
| | | | | 310/12.14 |
| 2013/0187504 | A1 | 7/2013 | Tanaka | |

FOREIGN PATENT DOCUMENTS

| | | | | |
|---|---|---|---|---|
| JP | 2004357357 | A | 12/2004 | |
| JP | 2009171687 | A | 7/2009 | |
| WO | 2004093306 | A2 | 10/2004 | |
| WO | 2014109220 | A1 | 7/2014 | |
| WO | WO-2014109220 | A1 * | 7/2014 | ............ H02K 19/22 |

OTHER PUBLICATIONS

"Classification of field-weakening solutions and novel PM machine with adjustable excitation" by H. Woehl-Bruhn, IEEE Paper, XIX International Conference on Electrical Machines—ICEM 2010, Rome.

* cited by examiner

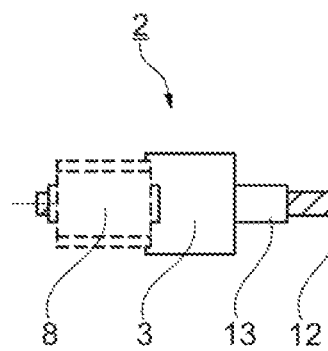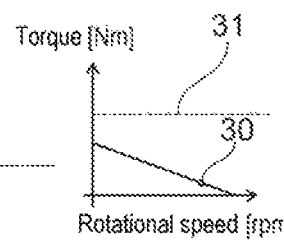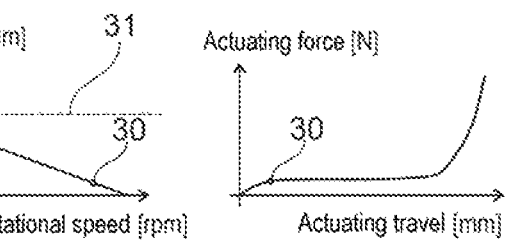
Fig. 7a  Fig. 7b  Fig. 7c
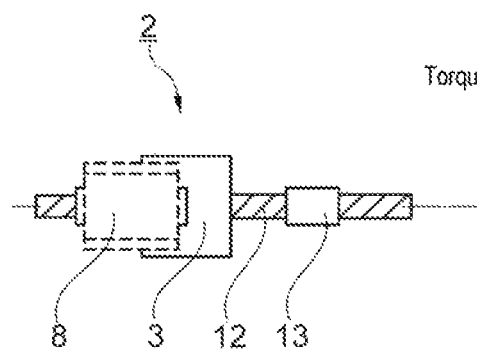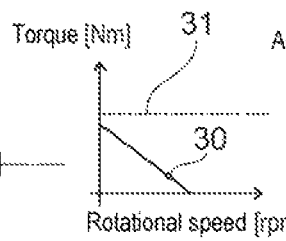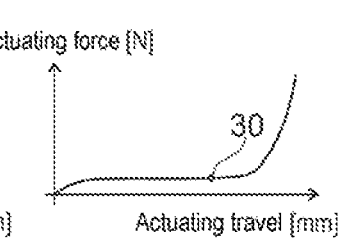
Fig. 8a  Fig. 8b  Fig. 8c
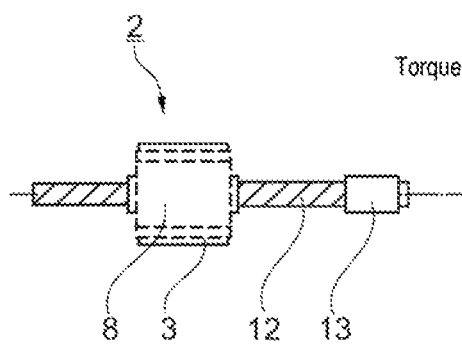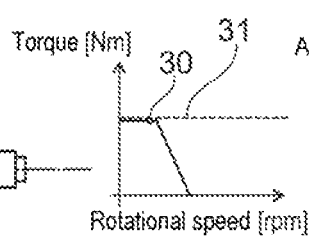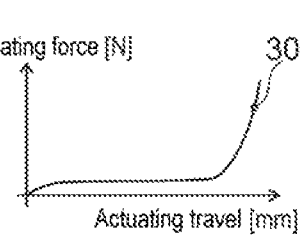
Fig. 9a  Fig. 9b  Fig. 9c

ELECTRIC MACHINE WITH VARIABLE MOTOR CONSTANTS

CROSS-REFERENCE TO RELATED APPLICATIONS

This application is the United States National Phase of PCT Appln. No. PCT/DE2016/200285 filed Jun. 22, 2016, which claims priority to German Application No. DE102015211531.3 filed Jun. 23, 2015, the entire disclosures of which are incorporated by reference herein.

TECHNICAL FIELD

The present disclosure relates to an electrical machine having a variable motor constant. The present disclosure further relates to an actuator comprising the electrical machine. In addition, the present disclosure relates to a method for varying the motor constant of the electrical machine.

BACKGROUND

A plurality of electromechanical mechanisms of action related to and implemented in automobiles is controlled with the aid of electrical motors. In addition, electrical motors can also be utilized in a plurality of other electrical machines and technical areas.

A motor constant, which is also referred to as a voltage constant or a torque constant, is decisively responsible for the electromechanical behavior of electrical machines. The motor constant is usually a fixed, machine-related variable which can be changed within the scope of a so-called field-weakening mode. All that is possible by way of the field-weakening mode, however, is a reduction in the motor constant.

Depending on the level of the motor constant, the electrical machine is capable of generating a higher maximum rotational speed or a greater maximum torque.

The torque of an electrical machine is dependent, in principle, on its working point that has been set, i.e., the torque is a function of the rotational speed. The correlation between rotational speed and torque is represented, in an electrical machine, via the so-called motor constant (torque constant) and is generally a slanted straight line.

A high motor constant results in a high torque in combination with a low maximum rotational speed. The motor constant for an electrical central release device can be, for example, 0.065 Nm/A. A low motor constant results in a lower maximum torque but a higher maximum rotational speed. The motor constant for a hydrostatic coupling actuator can be, for example, 0.027 Nm/A.

Approaches already exist for changing the motor constant by way of mechanical adjustment mechanisms: "Classification of field-weakening solutions and novel PM machine with adjustable excitation" by H. Woehl-Bruhn, IEEE Paper, XIX International Conference on Electrical Machines—ICEM 2010, Rome". The motor constant can be strengthened or weakened depending on the position of the rotatable magnets present in the electrical machine. The disadvantage of this presented method is that the motor constant cannot be changed during the operation.

The motor constants are generally fixedly predefined by way of the predefined machine topology and can be changed with the aid of control-related methods. In many cases it is advantageous to adapt the motor constant to the different load states. This means there are operating points within a cycle in which a high rotational speed is required, and there is also an operating point in which a high torque is necessary.

With respect to the motor design, a compromise is typically struck between two operating points in order to be able to implement the two working points. In this case, the inconsistency between insufficient torque and insufficient dynamics must be resolved.

Thus there is a long-felt need for optimizing the design of electrical machines which must have a high rotational speed, on the one hand, and a high torque, on the other hand, without needing to change the predefined determining factors, such as voltage supply, current limitation, or simple control methods.

BRIEF SUMMARY

The present disclosure describes an electrical machine comprising a stator and a rotor rotatably mounted in the stator. A spindle is guided through the electrical machine. At least one magnetic flux-conductive assembly which can be introduced into the electrical machine is provided. The magnetic flux-conductive assembly is disposed on the spindle in a linearly displaceable manner in order to vary a motor constant of the electrical machine as a result of a displacement into the electrical machine.

A change in the motor constant of the electrical machine can be achieved by providing the electrical machine. For this purpose, the magnetic flux-conductive assembly is displaced into the electrical machine. By way of a rotary motion of the electrical machine, a change in the motor constant is effectuated, which brings about an optimal machine behavior depending on the load to be driven.

The magnetic flux-conductive assembly can be displaced back out of the electrical machine. In this case, a change in the motor constant of the electrical machine can be achieved again.

An electrical machine is a machine utilized in electrical power engineering and is a form of energy converter. The electrical machine may be an electromechanical energy converter or a permanent magnet-excited synchronous machine.

A displacement may be understood to be an instance of moving. The displacement may take place linearly, i.e., in an axial longitudinal direction of the spindle. The magnetic flux-conductive assembly can be displaced, slid, introduced, or inserted into the electrical machine.

A rotary motion of the electrical machine effectuates a change in the motor constant. An optimal machine behavior is induced depending on the load to be driven.

The further the magnetic flux-conductive assembly is slid into the electrical machine, the greater the motor constant is. When a magnetic flux-conductive assembly has been slid entirely into the electrical machine, a high maximum torque in combination with a low maximum rotational speed can be achieved.

If the magnetic flux-conductive assembly has not been slid into the electrical machine, the motor constant is lower. In this case, a lower maximum torque in combination with a high maximum rotational speed is to be expected.

In one embodiment, the magnetic flux-conductive assembly is configured to be displaced relative to the electrical machine as a result of a rotation of the spindle.

Therefore, the magnetic flux-conductive assembly can be in this way can be displaced in the direction of the electrical machine.

In yet another embodiment, the magnetic flux-conductive assembly is disposed on the spindle so as to be displaceable by means of at least one mechanical coupling.

As a result of a rotary motion of the spindle, the magnetic flux-conductive assembly is linearly displaced on the spindle in an easy way.

In one embodiment, a spindle nut is disposed on the spindle in a linearly displaceable manner.

The spindle nut may be configured for generating a rotation of the spindle as a result of a linear displacement of the spindle. As a result of the linear displacement of the spindle nut, the magnetic flux-conductive assembly can be displaced in the direction of the electrical machine. The spindle nut may be in the form of a planetary rolling gear.

In yet another embodiment, the magnetic flux-conductive assembly comprises a cylindrical body which
is displaceable along an inner lateral face of the rotor, and/or
is displaceable along an outer lateral face of the stator.

A change in the motor constant of the electrical machine can therefore be achieved in an easy way. The magnetic flux-conductive assembly is displaceable into the electrical machine in such a way that a rotary motion of the electrical machine effectuates a change in the motor constant which induces an optimal machine behavior depending on the load to be driven.

The magnetic flux-conductive assembly can be introduced between the rotor and the spindle. The magnetic flux-conductive assembly can be slid over the outer lateral face of the stator. The magnetic flux-conductive assembly can be introduced between a housing wall of the electrical machine and the stator.

The magnetic flux-conductive assembly may be a sleeve or a flux return path plate.

In yet another embodiment, the electrical machine has freewheeling in order to retain its position during a rotation of the spindle.

Therefore, the electrical machine can be positioned independently of relative movements of the magnetic flux-conductive assembly.

The present disclosure also includes an actuator comprising an electrical machine, as described above.

In one embodiment, the actuator is a coupling actuator, a hydrostatic coupling actuator, or an electrical central release device.

In this way, a plurality of different actuators can be implemented in order to achieve a change in the motor constant.

The present disclosure also includes a method for varying the motor constant of an electrical machine. The electrical machine comprises a stator and a rotor rotatably mounted in the stator. A spindle is guided through the electrical machine. At least one magnetic flux-conductive assembly which can be introduced into the electrical machine is provided. The magnetic flux-conductive assembly is disposed on the spindle in a linearly displaceable manner. The method includes the following step:
linearly displacing the magnetic flux-conductive assembly into the electrical machine as a result of a rotation of the spindle during an operation of the electrical machine.

The method may include the following step:
linearly displacing the magnetic flux-conductive assembly out of the electrical machine as a result of a rotation of the spindle during the operation of the electrical machine.

The method may include the following steps in order to generate a rotation of the spindle:
linearly displacing a spindle nut which is disposed on the spindle in a displaceable manner, and
rotating the spindle as a result of a displacement of the spindle nut.

BRIEF DESCRIPTION OF THE DRAWINGS

The present disclosure will now be described by way of example with reference to figures. In the figures:

FIG. 7a shows a schematic view from FIG. 2 having a flux guide plate in a first position,
FIG. 7b shows a rotational speed-torque characteristic curve for FIG. 7a,
FIG. 7c shows an actuating travel-actuating force characteristic curve for FIG. 7a,
FIG. 8a shows yet another schematic view having a flux guide plate in a second position,
FIG. 8b shows a rotational speed-torque characteristic curve for FIG. 8a,
FIG. 8c shows an actuating travel-actuating force characteristic curve for FIG. 8a,
FIG. 9a shows yet another schematic view having a flux guide plate in a third position,
FIG. 9b shows a rotational speed-torque characteristic curve for FIG. 9a, and
FIG. 9c shows an actuating travel-actuating force characteristic curve for FIG. 9a.

DETAILED DESCRIPTION

Figure 1:
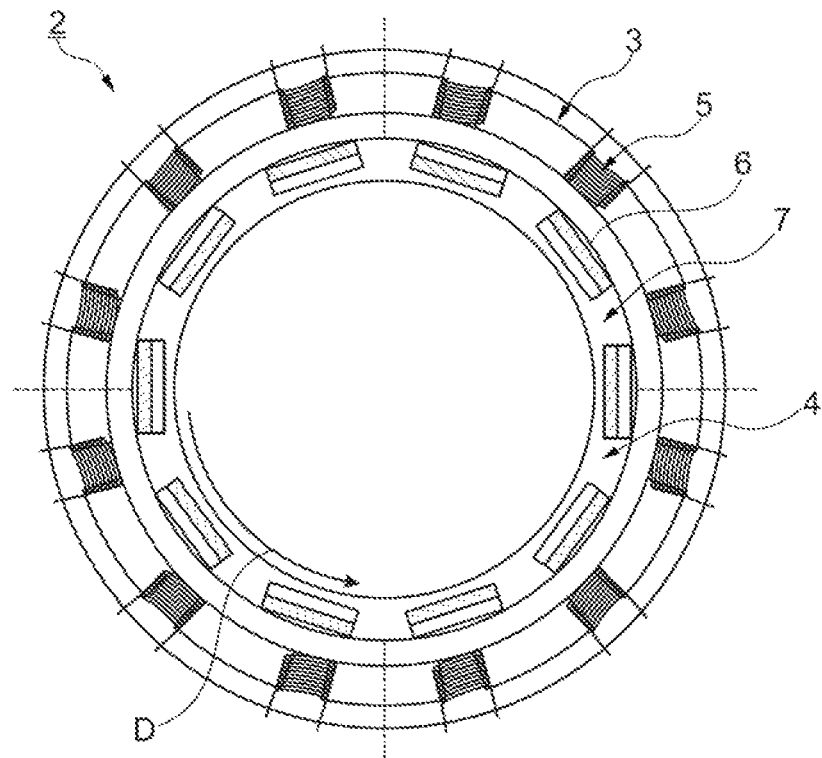
FIG. 1 shows a cross section of an electrical machine.

FIG. 1 shows a cross section of an electrical machine.

The electrical machine 2 is in the form of a permanent magnet-excited electrical motor having a radial design. The electrical machine 2 comprises a stator 3 and a rotor 4 which is rotatably mounted in the stator 3 and is designed to be rotatable in a direction D. Coils 5 are provided radially on the stator 3. Permanent magnets 6 are provided radially on the rotor 4.

In the case of the electrical machine 2, a simple flux return path plate 7 is provided on the rotor 4. The flux return path plate 7 has a narrow design, which results in a high leakage flux within the electrical machine 2. A motor constant is therefore reduced.

The low motor constant provides for a low maximum torque and a high maximum rotational speed.

Figure 2:
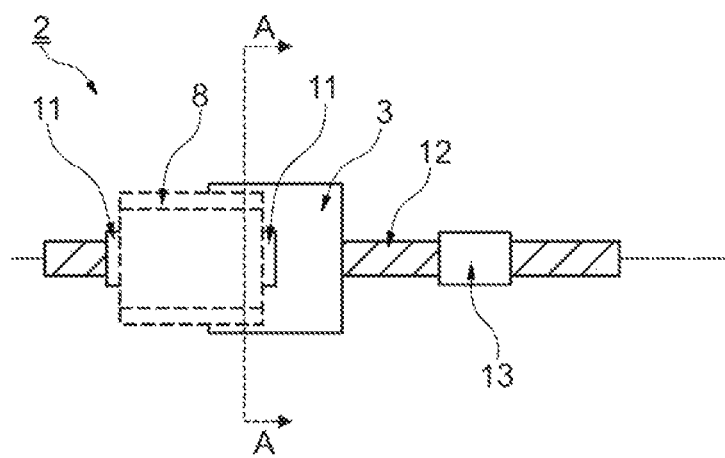
FIG. 2 shows a schematic view of a first electrical machine.

FIG. 2 shows a schematic view of a first electrical machine.

The electrical machine 2 comprises a spindle 12 which is guided through the electrical machine 2. Furthermore, a magnetic flux-conductive assembly 8 which can be introduced into the electrical machine 2 is provided. The magnetic flux-conductive assembly 8 is disposed on the spindle 12 so as to be linearly displaceable in an axial direction by means of mechanical couplings 11. The magnetic flux-conductive assembly 8 comprises a cylindrical body and is designed as an additional flux return path plate in the form of a sleeve. Furthermore, a spindle nut 13 is provided, which is also disposed on the spindle 12 so as to be linearly displaceable in an axial direction. The spindle nut may be in the form of a planetary rolling gear.

As a result of the linear displacement of the spindle nut 13, the magnetic flux-conductive assembly 8 can be displaced in the direction of the electrical machine 2. The magnetic flux-conductive assembly 8 has been partially inserted into the electrical machine 2. In this case, the magnetic flux-conductive assembly 8 is inserted into the electrical machine 2 along an inner lateral face 9 of the rotor 4. For this purpose, the spindle nut 13 has been displaced on the spindle 12 toward the right in the plane of the sheet.

A motor constant of the electrical machine 2 can therefore be varied in an easy way.

Figure 3:
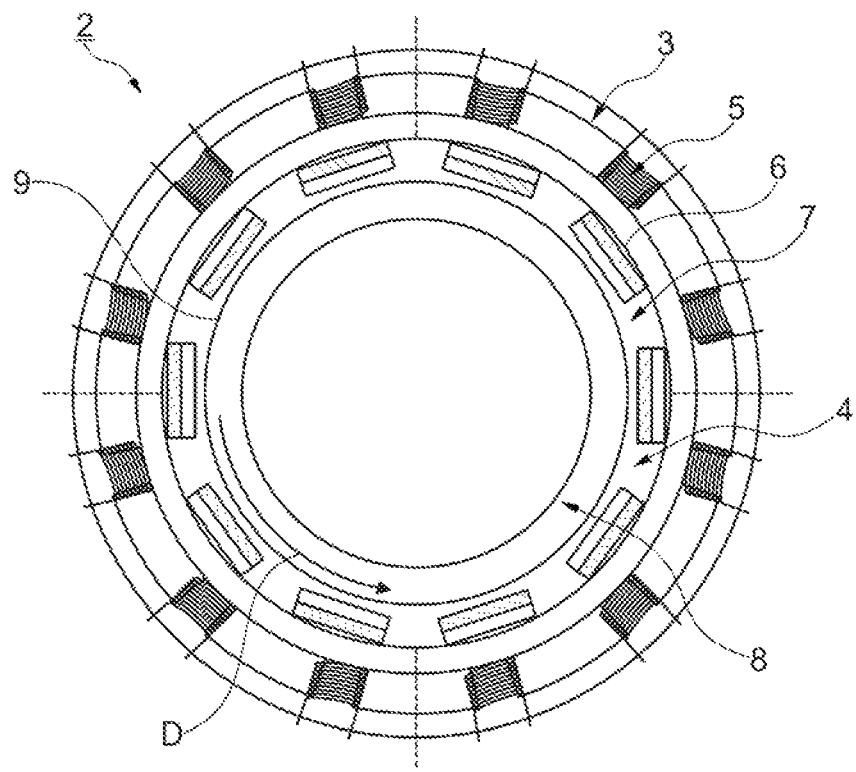
FIG. 3 shows a section A-A from FIG. 2.

FIG. 3 shows a section A-A from FIG. 2.

The electrical machine 2 is in the form of a permanent magnet-excited electrical motor having a radial design. The electrical machine 2 comprises a stator 3 and a rotor 4 which is rotatably mounted in the stator 3 and is designed to be rotatable in a direction D. Coils 5 are provided radially on the stator 3. Magnets 6 are provided radially on the rotor 4. In the case of the electrical machine 2, a simple flux return path plate 7 is provided on the rotor 4.

In contrast to FIG. 1, the magnetic flux-conductive assembly 8 which can be introduced into the electrical machine 2 is provided, wherein the magnetic flux-conductive assembly 8 is disposed on the spindle 12 in a linearly displaceable manner in order to vary a motor constant of the electrical machine 1 as a result of a displacement.

The magnetic flux-conductive assembly 8 is disposed, in this case, so as to be displaceable along the inner lateral face 9 of the rotor 4.

By providing the electrical machine with the magnetic flux-conductive assembly, a first possibility is provided for achieving a change in the motor constant of the electrical machine.

In this case, the magnetic flux-conductive assembly is displaced into the electrical machine, wherein a rotary motion of the electrical machine effectuates a change in the motor constant which induces an optimal machine behavior depending on the load to be driven.

Figure 4:
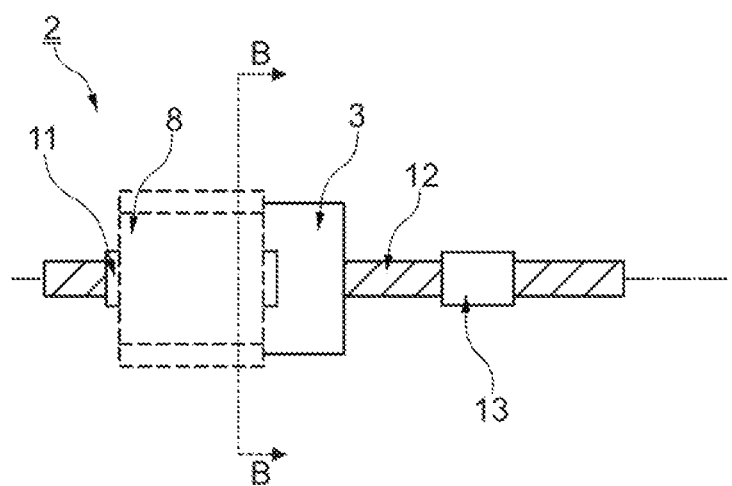
FIG. 4 shows a schematic view of a second electrical machine.

FIG. 4 shows a schematic view of a second electrical machine.

The electrical machine 2 comprises a spindle 12 which is guided through the electrical machine 2. Furthermore, a magnetic flux-conductive assembly 8 which can be introduced into the electrical machine 2 is provided. The magnetic flux-conductive assembly 8 is disposed on the spindle 12 so as to be linearly displaceable in an axial direction by means of mechanical couplings 11. The magnetic flux-conductive assembly 8 comprises a cylindrical body and is designed as an additional flux return path plate in the form of a sleeve. Furthermore, a spindle nut 13 is provided, which is also disposed on the spindle 12 so as to be linearly displaceable in an axial direction. The spindle nut may be in the form of a planetary rolling gear.

As a result of the linear displacement of the spindle nut 13, the magnetic flux-conductive assembly 8 can be displaced in the direction of the electrical machine 2. The magnetic flux-conductive assembly 8 has been partially inserted into the electrical machine 2. In contrast to FIG. 2, the magnetic flux-conductive assembly 8 is inserted into the electrical machine 2 along an outer lateral face of the stator 3. For this purpose, the spindle nut 13 has been displaced on the spindle 12 toward the right in the plane of the sheet.

A variant of FIG. 2 for varying a motor constant of the electrical machine in a simple way is therefore provided.

Figure 5:
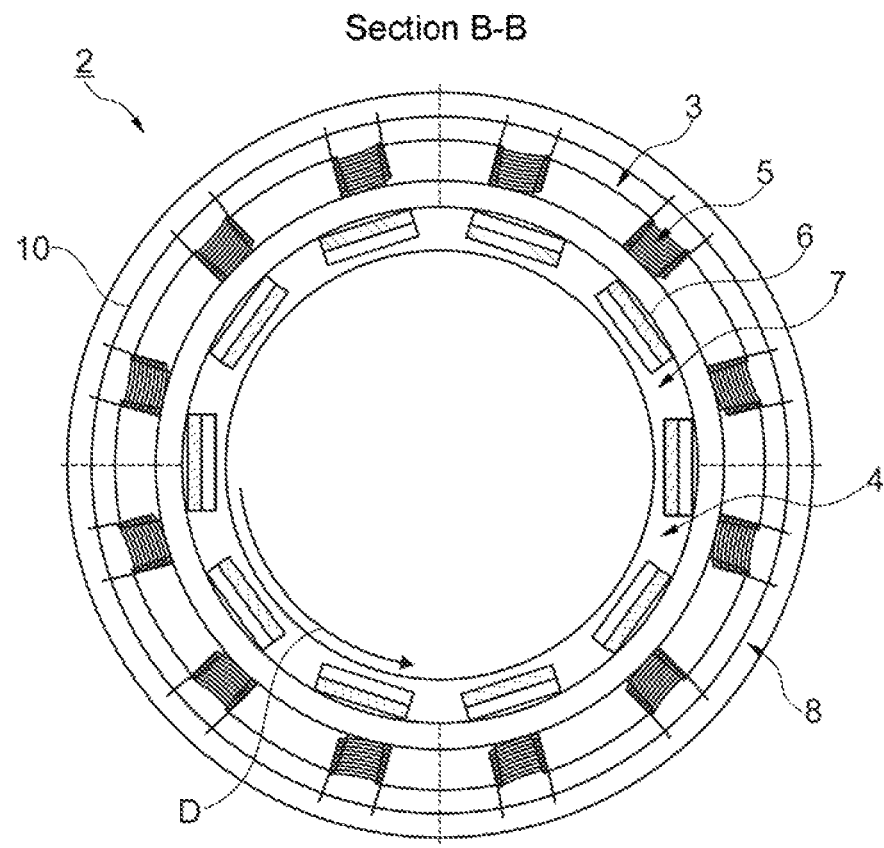
FIG. 5 shows a section B-B from FIG. 4.

FIG. 5 shows a section B-B from FIG. 4.

In contrast to FIG. 3, the magnetic flux-conductive assembly 8 has not been inserted along the inner lateral face 9 of the stator 3, but rather along the outer lateral face 10 of the rotor 4.

By providing the electrical machine with the magnetic flux-conductive assembly, a second possibility is provided for achieving a change in the motor constant of the electrical machine. The effect can be amplified by way of a flux-conductive element being simultaneously introduced in the rotor and around the stator.

Figure 6:
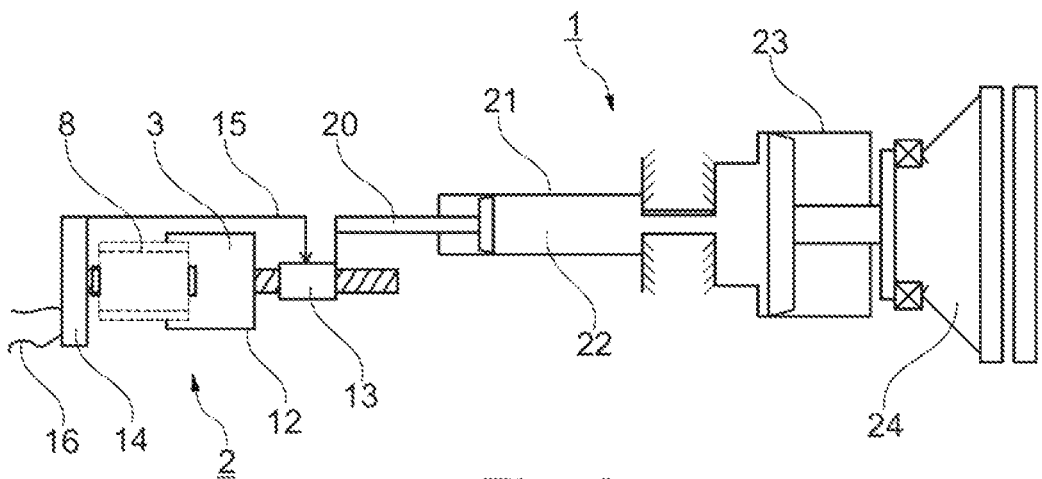
FIG. 6 shows a schematic view of an actuator comprising an electrical machine from FIG. 2.

FIG. 6 shows a schematic view of an actuator comprising an electrical machine from FIG. 2.

The actuator 1 is in the form of a hydrostatic coupling actuator. The actuator 1 comprises the electrical machine 2 from FIG. 2. The electrical machine 2 comprises an electronics system 14 and a linear sensor 15.

The linear sensor 15 is controlled by way of an actuation of the electronics system 14. For this purpose, a power supply is made available via an on-board electrical system 16. The linear sensor 15 is configured for detecting a linear displacement of the spindle nut 13. The linear displacement of the spindle nut 13 results in the magnetic flux-conductive assembly 8 being displaced toward the right, in the plane of the sheet, in the direction of the electrical machine 2.

The actuator 1 further comprises a master cylinder 21 including a primary piston 20, a slave cylinder 23, and a release bearing 24. The primary piston 20 is connected to the spindle nut 13. The master cylinder 21 is connected via a hydraulic system 22 to the slave cylinder 23 which, in turn, has been brought into contact with the release bearing including coupling 24.

The linear displacement of the spindle nut 13 results, on the one hand, in the magnetic flux-conductive assembly 8 being displaced toward the right, in the plane of the sheet, in the direction of the electrical machine 2. A motor constant of the electrical machine 2 can therefore be varied in an easy way.

On the other hand, the primary piston 20 also undergoes a linear displacement in the master cylinder 21. As a result, an actuation of the slave cylinder 23 is initiated, which actuates the release bearing including coupling 24.

FIG. 7*a* shows a schematic view from FIG. 2 having a flux guide plate in a first position, FIG. 7*b* shows a rotational speed-torque characteristic curve of the electric motor for FIG. 7*a*, and FIG. 7*c* shows an actuating travel-actuating force characteristic curve of the spindle for FIG. 7*a*.

The actuator 1 requires a high maximum rotational speed, since merely a low load occurs at the working point 30 on the rotational speed-torque characteristic curve and, therefore, the working point 30 of the electrical machine 2 is located close to the maximum rotational speed 31.

FIG. 8*a* shows yet another schematic view having a flux guide plate in a second position, FIG. 8*b* shows a rotational speed-torque characteristic curve of the electric motor for FIG. 8*a*, and FIG. 8*c* shows an actuating travel-actuating force characteristic curve of the spindle for FIG. 8*a*.

As a result of the displacement of the spindle nut 13 on the spindle 12, the additional flux guide plate 8 is displaced in the direction of the electrical machine 2 and is partially introduced therein. The motor constant of the electrical machine 2 is increased as a result.

FIG. 9*a* shows yet another schematic view having a flux guide plate in a third position, FIG. 9*b* shows a rotational speed-torque characteristic curve of the electric motor for FIG. 9a, and FIG. 9c shows an actuating travel-actuating force characteristic curve of the spindle for FIG. 9a.

The flux guide plate 8 has been introduced entirely into the electrical machine 2. This results in a high load torque having the greatest force. The working point 30 has been displaced into a range of lower rotational speeds and into the range of its maximum torque.

In summary, it can be said with respect to FIGS. 7a to 9c that the further the magnetic flux-conductive assembly 8 is inserted into the electrical machine 2, the higher the motor constant is.

When a magnetic flux-conductive assembly 8 has been slid entirely into the electrical machine 2, a high maximum torque in combination with a low maximum rotational speed can be achieved.

If the magnetic flux-conductive assembly 8 has not been slid into the electrical machine 2, the motor constant is low. In this case, a low maximum torque in combination with a high maximum rotational speed can be achieved.

LIST OF REFERENCE SIGNS 1 actuator
2 electrical machine
3 stator
4 rotor
5 coil
6 magnet
7 simple flux return path plate
8 magnetic flux-conductive assembly
9 inner lateral face
10 outer lateral face
11 coupling
12 spindle
13 planetary rolling gear
14 electronics system
15 linear sensor
16 on-board electrical system
20 primary piston
21 master cylinder
22 slave cylinder
23 hydraulic system
24 release bearing including coupling
30 working point
31 maximum torque due to current limitation
D direction of rotation

The invention claimed is:

1. An actuator comprising an electrical machine, the electrical machine comprising:
    a stator;
    a rotor rotatably mounted in the stator;
    a spindle extending through the electrical machine; and,
    at least one magnetic flux-conductive assembly disposed on the spindle in a linearly displaceable manner, wherein a motor constant of the electrical machine varies as a result of a displacement of the magnetic flux-conductive assembly into the electrical machine.

2. The actuator as claimed in claim 1, wherein the magnetic flux-conductive assembly is configured to be displaced relative to the electrical machine as a result of a rotation of the spindle.

3. The electrical actuator as claimed in claim 2 further comprising a mechanical coupling for displacing the magnetic flux-conductive assembly.

4. The actuator as claimed in claim 2 further comprising a spindle nut disposed on the spindle in a linearly displaceable manner.

5. The actuator as claimed in claim 2 wherein the magnetic flux-conductive assembly is a sleeve or a flux return path plate.

6. The actuator as claimed in claim 1, wherein the magnetic flux-conductive assembly comprises a cylindrical body that is displaceable along:
    an inner lateral face of the rotor; or,
    an outer lateral face of the stator.

7. The actuator as claimed in claim 1, wherein the actuator is selected from the group consisting of a coupling actuator, a hydrostatic coupling actuator and an electrical central release device.

8. A method for varying the motor constant of the electrical machine of the actuator claimed in claim 1, comprising rotating the spindle and linearly displacing the magnetic flux-conductive assembly into the electrical machine during an operation of the electrical machine.

* * * * *